July 18, 1939.    R. L. R. ATCHERLEY    2,166,575
MEANS AND METHOD FOR REFUELING AIRCRAFT IN FLIGHT OR LIKE OPERATION
Filed May 15, 1936    4 Sheets-Sheet 1
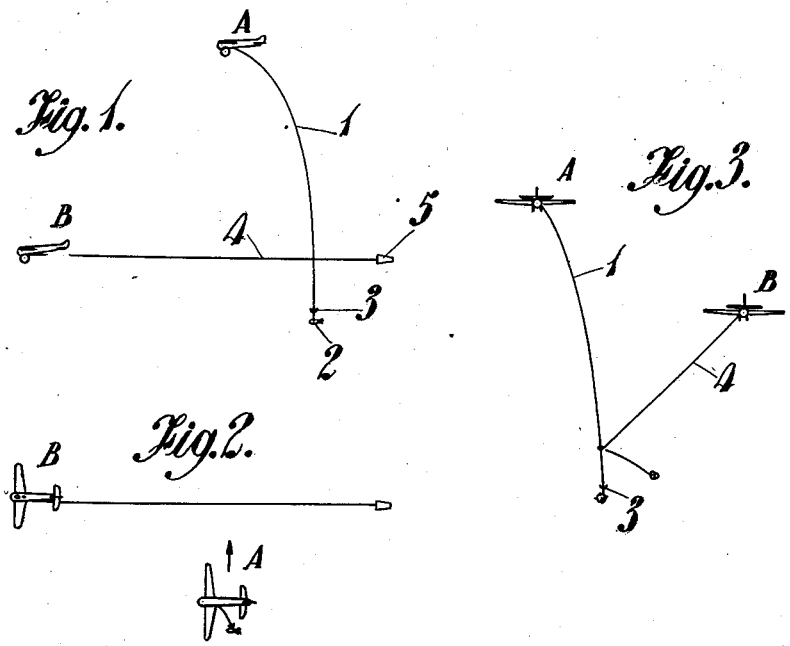
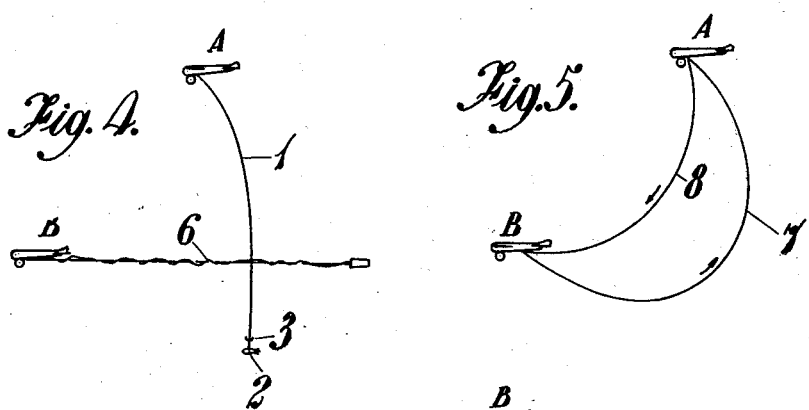
Inventor
Richard L. R. Atcherley
By Jno. Lourie Atty.

July 18, 1939.　　　R. L. R. ATCHERLEY　　　2,166,575
MEANS AND METHOD FOR REFUELING AIRCRAFT IN FLIGHT OR LIKE OPERATION
Filed May 15, 1936　　　4 Sheets-Sheet 2
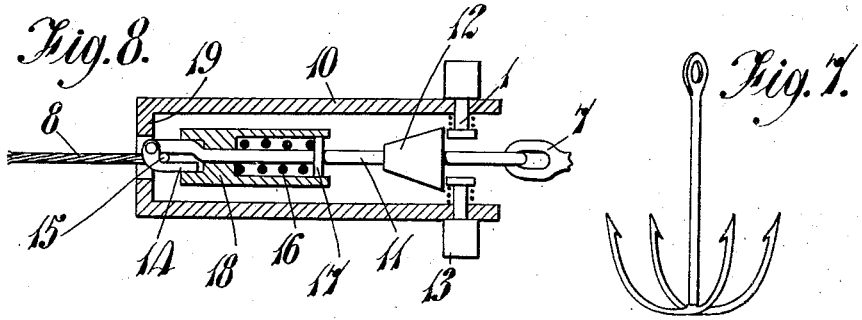
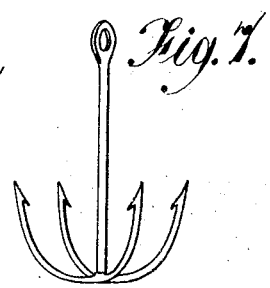
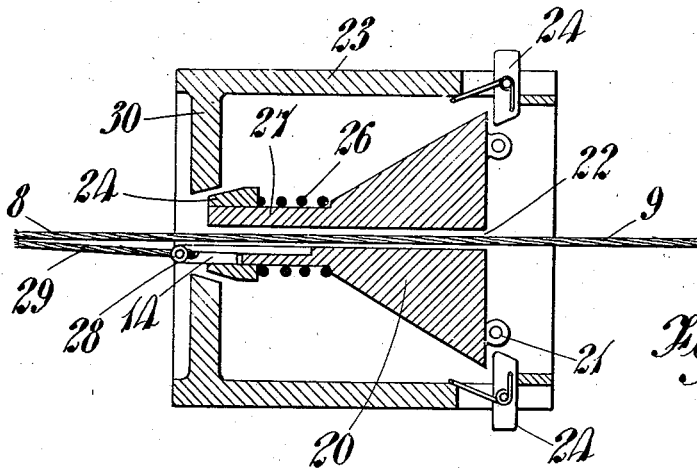
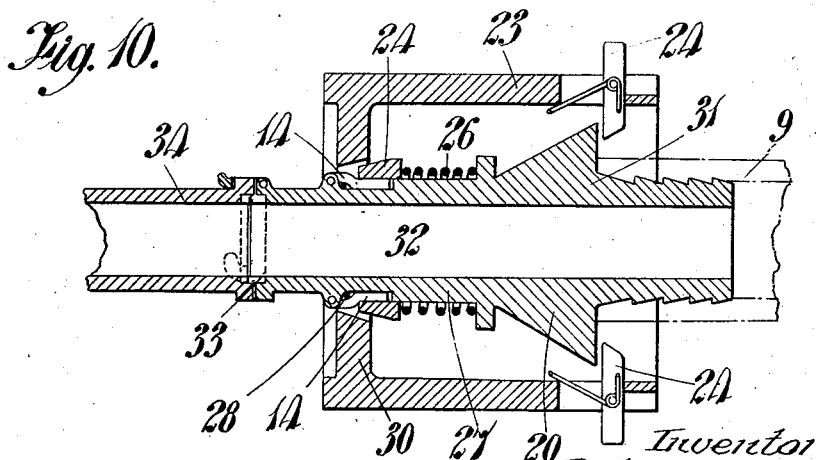

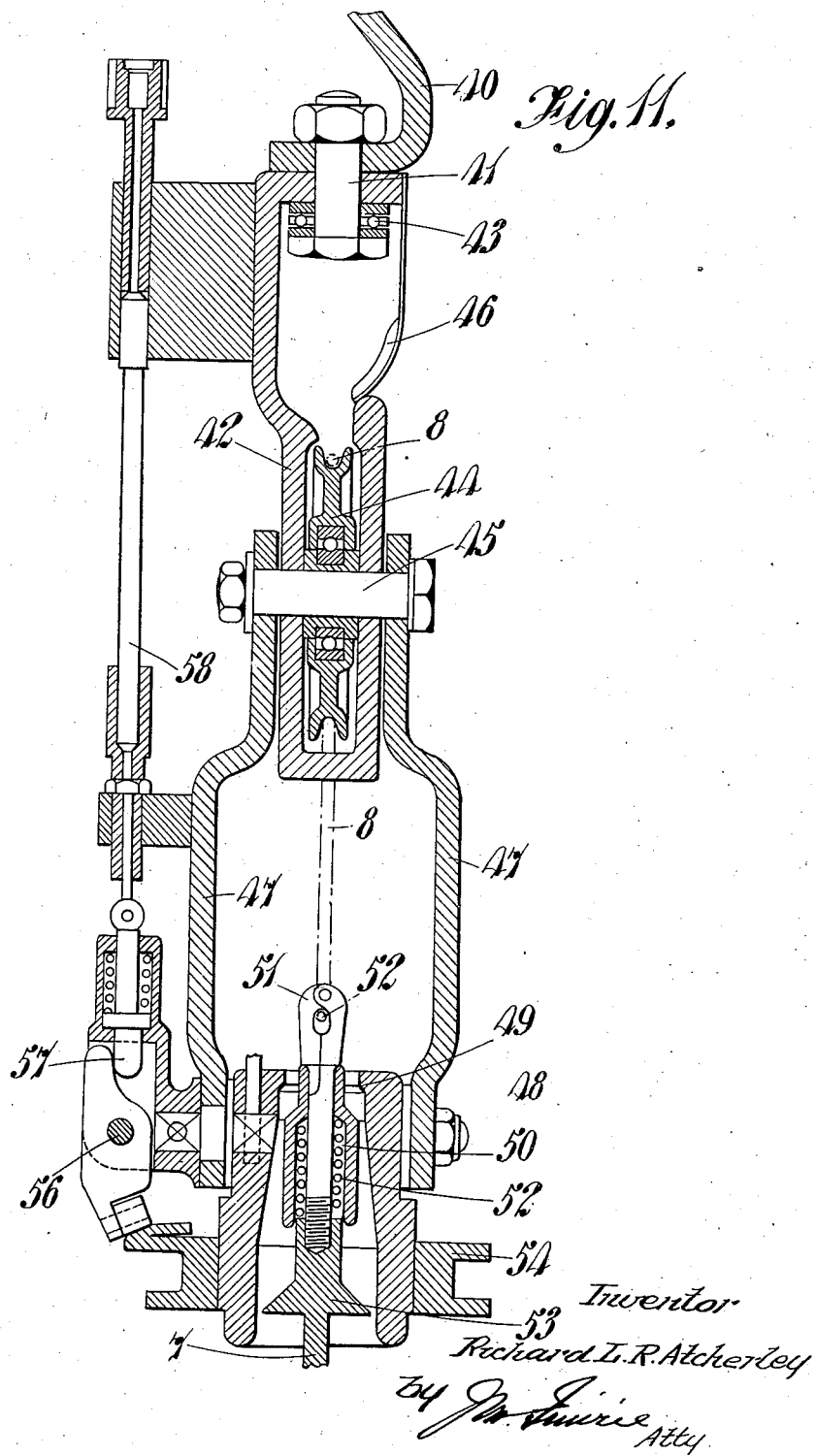

July 18, 1939.  R. L. R. ATCHERLEY  2,166,575
MEANS AND METHOD FOR REFUELING AIRCRAFT IN FLIGHT OR LIKE OPERATION
Filed May 15, 1936  4 Sheets-Sheet 4

Inventor
Richard L. R. Atcherley
by
Atty.

Patented July 18, 1939

2,166,575

UNITED STATES PATENT OFFICE 2,166,575

MEANS AND METHOD FOR REFUELING AIRCRAFT IN FLIGHT OR LIKE OPERATION

Richard Llewellyn Roger Atcherley, South Farnborough, England

Application May 15, 1936, Serial No. 79,980
In Great Britain June 4, 1935

13 Claims. (Cl. 244—135)

This invention relates to a method and means for refueling aircraft in flight, and for conveying articles between aircraft in flight. It may be desirable for many reasons, that communication should be quickly and safely established between two aircraft in flight, and that practical use should be given to communication when once it has been established. The invention seeks to provide such communication and use. In previous suggestions for the refueling or transfer of goods from one aeroplane to another, some of which suggestions have been carried into effect, a weighted line was trailed from one aeroplane and the other aeroplane was manoeuvred so that an operator in the second aeroplane could catch the end of the line and thereafter use it to pull in a pipe to which it was attached, or, if the line was itself a pipeline, hold or secure it for the purpose of a flow of liquid fuel into a suitable receptacle. This proposal, in general, involved considerable risk and offers many difficulties. With the present invention, however, communication can be established between two aircraft in flight with facility, without the exercise of great skill in piloting, and with the allowance of wide margins of error to accommodate for roughness of the air, or other difficulties. It is also believed to practically entirely eliminate any risk to the structure of the aircraft or to their propellers.

The method of conveying fluids or articles between aircraft in flight which forms the basis of this invention, consists first in trailing a heaving line behind a first aircraft; second, in catching or attaching this heaving line with or to a supplying line trailed behind the second aircraft; and third controlling the approach or connection of the supplying line to the aircraft with which it is desired to communicate by running the heaving line in or out in relation to the aircraft which carries it. For the sake of convenience and where the context and sense permit, it is understood that "line" is used to describe a rope, cord, cable, pipe, or the equivalent, or a doubled line, which is adapted to pulling, and is flexible. "Heaving line" means a line used for the purpose of pulling another line or pipeline. "Pipeline" means a pipe such as would be used for transmitting liquid fuel or other fluid to be transmitted. "Cow" means an aircraft from which fuel or other material is to be transferred to another. "Calf" means an aircraft to which it is required to transfer fuel or other material. "Part" of a line means, as in nautical phraseology, one length or stretch of a line, extending for example from a pulley, as distinct from another "part" of the same line extending from the other side of the same pulley or equivalent.

Further in accordance with the invention, the method of establishing connection between the cow and the calf in flight for the conveyance of fluids or articles, consists in trailing from each craft a line, the lines being adapted to trail at a substantial mean angle to each other when the aircraft fly at equal speed, and then causing one line to intersect the other and then heaving one line in to its aircraft with the other line engaged thereby. Further, a method of refueling a calf in flight from a cow in flight consists in extending a flexible fuel pipeline from the cow, connecting its outer end to one part of a heaving line extending from the calf, passing the calf's line over a pulley or equivalent in the calf and allowing the other part of the calf's line to be pulled away from the calf by dragging, so that the end of the pipeline is pulled towards the calf by that same dragging, and refueling contact is established.

In an alternative application of the method broadly stated above, one craft is equipped with a double and looped line, and the other craft with a single line, these lines being caused to intersect, the loop heaved in to the second craft, and then being passed over a pulley or equivalent in the second aircraft and the loop thereafter being used in a manner reminiscent of an endless belt conveyor.

The invention further includes apparatus for the carrying out of the method above stated. This apparatus consists first in the combination of aircraft and of lines adapted to carry out the method, and second consists in various mechanical contrivances described more fully hereafter for facilitating the operation of the method.

The accompanying drawings, which are purely diagrammatic, illustrate various aspects of the invention.

Figures 1, 2 and 3 are diagrams respectively showing side elevation, plan, and front elevation, of two aircraft engaged in effecting contact for the purpose of refueling or intercommunication;

Figures 4, 5, and 6 are diagrams all in side elevation illustrating an elaboration of the previous figures;

Figure 7 illustrates in perspective a suitable grapnel for use in attaching one line to engage another;

Figure 8 is a diagrammatic side elevation in section showing an automatic retaining catch device with releasing means;

Figure 9 is a diagrammatic side elevation in section showing a retaining device which allows a line to run through it, merely releasing and catching an object on such line;

Figure 10 is a diagrammatic side elevation in section of an automatic catching pipeline device;

Figure 11 is an elevation in section of a unit comprising a swivelling pulley and a coupling and disengaging device similar to that of Figure 8 and specially adapted for the looped line of Figures 4 to 6.

Figure 12:
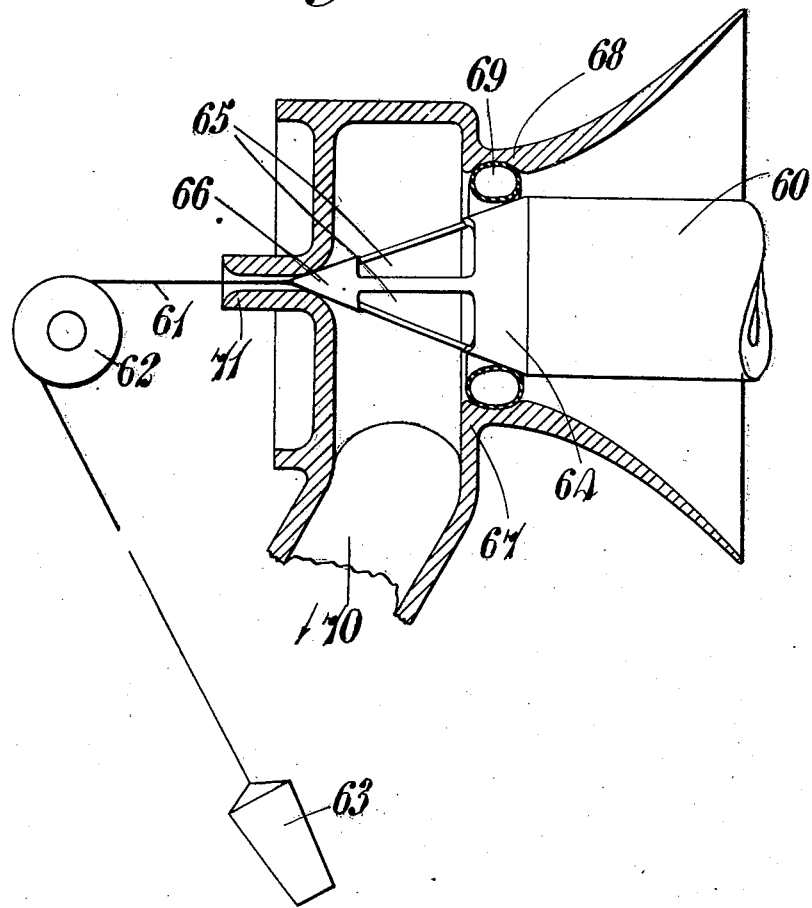
Figure 12 shows diagrammatically the means for carrying out the method whereby refueling contact may be sustained.

Turning now to Figures 1 to 6, in each case one aircraft which may be regarded as being the calf, i. e. that which is to receive fuel or articles, is "A", whilst the cow is "B". There would appear to be no reason, however, why these functions should not be interchanged. Figures 1, 2 and 3 illustrate what may be called a simple line method of operation. Figure 1 is a side elevation (in which the relative spacing and formation of the aircraft is very much exaggerated for clearness) and it shows aircraft A with a line trailing therefrom which is the heaving line 1, and which carries at its free end a weight, for example a somewhat streamlined weight, at 2, and near its end a grapnel 3 which may well be in the form of that shown in Figure 7, and need only be quite small, e. g., 4" across. By the term "mean angle" is meant the angle which the end of the line bears from the horizontal in relation to the aircraft; by suitably arranging the weight 2 in relation to the speed of the aircraft and characteristics of the line 1, the angle may easily be of the order of 75° to 80°, and the provision of the weight 2 therefore adapts the line to its particular purpose in this system. Aircraft B trails a second line 4, and this is adapted to trail substantially horizontally, either by being light in itself and having relatively high drag in relation to weight, or maybe by having a small drogue or wind-sleeve such as 5 attached to the outer end thereof. Aircraft B is assumed to be flying on a steady course at a steady height and speed; A flies in formation on B somewhat astern, above, and to one side; preferably in practice, the formation is at all times as nearly as possible level, the step-up in the diagrams being considerably exaggerated. Figure 1 illustrates this condition. Now A, by suitable control or manipulation, traverses across the track of B so that line 1 intersects line 4 and a state of affairs arises which is very crudely represented in Figure 3. Figure 2 shows the condition at the commencement of traverse, as it might be seen in plan. Line 1, having as it were fouled line 4, is then heaved home, and the grapnel 3 ensures interengagement between the lines 4 and 1. To facilitate or ensure this interengagement, both lines may have engaging means, e. g., grapnels, or one may have a grapnel and the other any suitable stop near its end. It is clear that the operator in A can bring line 4 actually to hand if desired, and thus interconnection between the aircraft is established. Thereafter it may be possible for line 4 to be used as a heaving line to bring in a pipeline, or simply to bring in some article requiring to be transferred, and it may be that in some cases it will actually be detached together with its burden from B, if no subsequent operation is required.

The fundamentals of a slightly more elaborate embodiment of the invention is shown in Figures 4 to 6. The equipment of aircraft A is exactly the same so far as effecting interconnection is concerned. In this case B trails a double line; this is a long bight or loop, which when trailing is virtually a single line as at 6. In practice the line 6 generally twists throughout its length. Actual interconnection and heaving is carried out as in the previous example. When line 6 is heaved home to A, the bight is engaged over a pulley or equivalent such as a fairlead, which is itself mounted on a swivel, and if the out and return parts of 6 are suitably arranged as regards their drag characteristics and weight, the twists will unravel and the two lengths will separate, substantially as indicated in Figure 5, where it will be seen that there is an "out" line 7 and an "in" line 8. The swivelling of the pulley or fairlead at A allows this unravelling to take place. In practice 7 may drag a considerable distance through a loop, behind the two aircraft, whilst 8 passes practically straight between them. If the lines 7 and 8 are suitably connected to reels or winches in B, they can be used virtually as an endless belt for conveying purposes. 7 may be a pipeline, or may be connected to a pipeline which is kept on a reel in B, and which may be drawn out by heaving on 8. An indication of the final relative positions is given in Figure 6.

The subsequent examples and illustrations deal wholly with a case of interconnection such as that of Figures 4 to 6 and therefore contemplates the use of a double line. Turning to Figure 8, a fitting is illustrated diagrammatically which is intended to be a fixture in A; this fitting consists virtually of a partially closed cylinder 10 which must be split completely along its length to allow of the line 8 being entered into it. At some point between lines 7 and 8 there is interposed a quick release fitting; this also embodies a catch device. It consists of a shank or rod 11 on which is fixed a conical catch member 12 adapted to enter between and force apart two spring-pressed plungers 13 in the wall of the cylinder 10. When the cone is past these plungers it is caught by them and is retained until the plungers are drawn apart, for example by hand. Thus retention of the line 7 is assured by aircraft A. The shank 11 has at its end a pivoted retaining catch 14 adapted to retain an eye or loop in the end of the line 8, as at 15. Slidable upon the shank 11, against a spring 16 and fixed flange 17, is a sleeve 18 the outer end of which is recessed to engage the catch 14 and keep it in the closed position normally. Now if the line 8 be forcibly pulled, the sleeve 18 will abut against the flange 19, which partially closes the end of the cylinder 10, so that the spring 16 will be compressed, and by the time the catch 14 is clear of the flange 19, through which it will have passed, it is free from the sleeve 18 and thus free to fly open, releasing the line 8. Thus the fitting as a whole provides for the retention of the end of the line 7 and disengagement of the line 8, and all this can be effected simply by heaving on the line 8 once it has been passed into the cylinder 10 through the radial and longitudinal slot above mentioned.

Figure 9 shows a device constructed to allow a line such as 8—9 (when one continuous line) to be drawn through it, and to carry to aircraft A an article attached to a fitting and automatically to leave that fitting as it were attached to aircraft A. In this case there is threaded upon the line 8—9 a fitting comprising a cone 20 which may have any suitable means such as eyes 21 for the attachment of an article or articles thereto, and the cone is axially bored at 22 for the free passage therethrough of the line 8—9. The cone is adapted to enter a cylindrical body 23 which is fixed in aircraft A, and having entered 23, is retained therein by pivoted spring latches 24. The entering end of the cone has upon it an axially slidable collar 25 working against a spring 26, which is mounted on a cylindrical part 27 of the cone. This forward part also carries a quick-detachment catch 14 adapted to engage a loop or bight 28, attached in turn by a short length of cable 29 to the cable 8. In this case therefore, once the line 8—9 has been engaged into the cylinder 23 for example through a suitable longitudinal slot, the line 8—9 is passed by heaving or otherwise, and the conical fitting which is heaved therewith by the short length 29 is in rapid sequence caught up by the device and released from the cable. It can, of course, afterwards be freed from the cylinder 23 by operating the latches 24, when it can, if necessary, be sent back along the cable 8.

Figure 10 illustrates a modification of a somewhat similar device which is adapted for pipeline working, for example for refueling. In this case the lines are not themselves shown because the pipeline itself is intended to be the line 9 and is indicated as such. As in Figure 9, one aircraft is provided with a cylindrical fitting 23 with latches 24, and an end flange 30, and it is assumed that this fitting may have the longitudinal slot as before mentioned. A heaving line, not shown, with a grommet or collar indicated by 28, is (for heaving) connected to fuel pipe 9; the pipe has at its end, with which connection is required to be established, a nozzle fitting comprising a serrated spigot 31 (to which the pipe proper is attached), and a retaining conical part 20, a spring 26 upon a cylindrical part 27, a slidable collar 25, and in this case a pair of catches 14, all virtually as in Figure 9, the only difference being that the whole of this catch fitting has an axial open bore 32 acting as a nozzle. The open end of this nozzle is provided with a quick release and gland coupling as illustrated diagrammatically at 33, by which it can be coupled in a fluid-tight manner with the end of a pipe 34 belonging to the receiving aircraft, and leading for example to a fuel tank. In this case the catches 14 retain the grommet 28 which forms the end of the heaving line. The operation of heaving in and catching it as before, and the heaving line 8 may be automatically released as before, or not, according to choice, and in any event in order to pass fuel, the operator at A simply has then to effect the connection at 33.
In any of these cases the plungers or latches which catch line 9 (e. g., latches 24) may be arranged to yield under an overload; and a coupling such as 33 may also be arranged so that it will uncouple in the event of excessive tension on line 9.

Figure 11 shows rather more practically a complete fitting for aircraft A, showing how the ideas previously described may be carried out in practice. This is a fitting for double line usage, i. e., in accordance with Figures 4 to 6. This fitting embodies a suitable pulley with a quick engagement and retaining device, and swivel, which is regarded as being necessary, and also a line-retaining and quick-releasing device. It may in some cases be deemed desirable to provide also for the manual rotation of the block, in the swivelling sense, if it will not readily rotate by the unravelling of the lines. In the construction illustrated there is attached, for example by a short length of cable, to the aircraft A, a lug 40. Through the medium of a pivot pin 41 a pulley block 42 is swivelled to the lug 40, preferably with a ball bearing interposed in thrust at 43. The pulley block has a ball bearing pulley at 44 carried on a spindle 45, which also serves to secure to the block 42 another part of the device. One side of the block 42 has a resilient catch in the form of an inwardly yieldable spring fitting 46 which allows a line to be entered into the block without having to be rove through, and which retains the line in the block so long as it is not unrove. Thus the bight forming the line 6 of Figure 4 can readily be engaged upon the pulley 44, and the swivel mounting then allows bodily rotation of the block so that the line can unravel.

The spindle 45 attaches to the block 42 a fitting which corresponds roughly to the cylindrical fittings 19 or 23 of Figures 8 to 10, and which has side members 47 extending radially away from the spindle 45 and holding between them, with its axis substantially tangential to the pulley 44, a longitudinally split sleeve or cylinder 48. The sleeve 48 has a constricted internal bore with a shoulder at 49 adapted to arrest the sleeve 50 of a quick-release catch 51, against the spring 52. The catch 51 forms part of an eye which is virtually the end of a line 7 and attaches line 7 to line 8; line 8 is indicated diagrammatically so as to show its passage over the pulley 44. Line 7 has a retaining cone 53 (analogous to the cones of Figures 8 to 10), and in the wall of the sleeve 48 are suitable radially operating latches which are not shown, to retain the cone 53. Although it is not an essential feature of the invention, it may be mentioned that such latches may be released through the medium of an external axially slidable collar 54 which is normally held in a downward position by one end of a trigger 55 pivoted at 56 and held, until tripped, by a spring-urged plunger 57 releasable temporarily by an operator by pulling on the stem 58. As has been mentioned, this fitting is intended to be secured or attached to aircraft A; there may be cases, however, where it is desired to carry it in aircraft B, in which case the line may be permanently rove over the pulley 44, and the block 42 need not have the catch 46. Then, the fitting as a whole is trailed at the end of line 6 (Figure 4) and is heaved home to aircraft A, where it is suitably secured and will rotate on its swivel, to unravel the line. This procedure may have the advantage of preventing an operator from inadvertently entering the bight of the line 8 in the wrong sense of direction over the pulley, and also may obviate the necessity of providing the longitudinal slot above mentioned, which serves to permit the entry of the line. In any event it is preferred to provide some device to prevent this mistake occurring, a simple instance of which would be the mere marking of the line in some unidirectional manner.

It will readily be understood that in any of the constructions above indicated it is quite easy to arrange for safety devices, as nearly all the potentially dangerous engagements and the like can be arranged to yield under overload. It will also be found in practice that if the aerodynamic properties of the various lines be suitably chosen, and the aircraft be suitably flown and manipulated practically all heavy work may be obviated, because the lines may run in the appropriate direction practically effortlessly, or in some cases spontaneously, for example, being held constantly in tension by a drag or weight. In fact such effects may be enhanced by the application of artificial dragging elements or weights in appropriate positions, and it is anticipated that quite heavy articles might be transferred without the necessity for a power unit or the expenditure of heavy labour. Drogues may be attached to one or more lines to effect such purposes, and to apply operative power to a heaving line. A line over a pulley, with a drogued free end, is applicable as indicated in Figure 12, by way of example.

In this figure, a method is involved which can be regarded as a compromise between the single and double line methods. A pipeline 60 is in permanent connection with a heaving line 61, which is arranged to run over a pulley 62 in the calf aircraft, and to have a free part with a drogue 63. The pipeline 60 has a nozzle of general tapered or pointed form, preferably a metal fitting 64, with openings in it at 65 and with a point at 66 which may be rubber or otherwise resiliently surfaced. The conical fitting is adapted to enter a housing in the form of a hollow metal body 67 with a bell mouth 68 lined with an annular packing gland 69 which may be an inflated hollow rubber or like ring. From the space within the body 67 leads a fuel pipe 70 to the tank or tanks. The body 67 has a comparatively narrow neck at 71 with an internally tapered bore into which the point 66 is adapted to enter and fit tightly, and through which the line 61 can run.

The line 61 is in this case permanently rove through the neck 71 and body 67; with its drogue end inboard, its other end is trailed, as the line 1 or 4 of Figure 1 for example.

The cow aircraft having brought that end home attaches the pipeline 60, whereupon the operator of the calf releases the drogue 63, which drags the line 61 over the pulley 62, and brings home to the calf the nozzle end of the pipeline 60. The tension due to the drogue 63 is arranged to maintain a sufficiently tight fit of the gland 69, but if the two aircraft inadvertently increase their formation distance excessively, the fitting 64 is free to leave the body 67 which it does, pulling home the drogue 63 to the calf to an extent depending on the increase of distance. The drogue thus not only automatically effects coupling but maintains it until excessive stresses would otherwise arise, relieving such stresses and allowing great elasticity of formation. A device such as that of Figure 8 or 9 may be employed by the calf to retain the drogue but release it from the line 61 if the drogue should be brought right inboard by a maximum excess of formation distance.

It will also be appreciated that the invention includes the method by which goods or articles may be transferred or conveyed, the devices described forming a novel type of conveyor. It will be appreciated that the facility with which this invention can be used in practice may be greatly enhanced, and in some cases may only be rendered practicable if power is used for some or all of the heaving operations. The outstanding cases are those of the double line method, and the method of Figure 12. Either aircraft may be equipped with a power driven capstan whereby it can so to speak circulate the double line in the manner of an endless conveyor, or heave a pipe or line. Power for such a capstan may be supplied for any suitable mover, for example an electric motor or a wind vane motor; or instead of a capstan the bight of the line at B may pass over a pulley, and the line itself be caused to run by a difference of drag on its two lengths. It will be understood that one intention in this respect is to enable a cow machine to carry practically all the weighty equipment, so that a calf, having once established contact with the cow, can leave the whole of the heavy work to the cow, or to its own drogue.

What I claim to be new is:

1. A method of establishing physical connection between independent dirigible aircraft while in flight, consisting in trailing a line from one aircraft and maintaining such line substantially in the horizontal plane of flight of the aircraft, trailing a second line from the cooperating aircraft, maintaining the second line at a substantial angle to the horizontal plane of flight of the second aircraft, maneuvering the aircraft to cause the lines to intersect beyond the aircraft, one of the lines having engaging means so that on intersecting the other of such lines a substantial connection between the lines will be established, and drawing one of the lines into the aircraft to which it is connected to thereby draw into such aircraft the line connected to the other such aircraft, whereby to establish physical connection between the aircraft for the transfer of any materials.

2. A method of refueling dirigible aircraft while in flight, consisting in trailing a flexible fuel pipe from the fuel-carrying aircraft, trailing a line from the aircraft to be refueled, one end of which is provided with a drag and the other end of which is connected to the free end of the fuel pipe, and permitting the drag-carried end of the line to be pulled away from the aircraft to be refueled to thereby draw the line-connected end of the fuel pipe into refueling position in the aircraft to be refueled.

3. Means for establishing physical connection between dirigible aircraft in flight including a line associated with and adapted to trail from one aircraft in substantially the horizontal line of flight of the aircraft, a line associated with and adapted to be trailed from a second aircraft at a substantial angle to the horizontal line of flight of said second aircraft and means on the trailing line from one of the aircraft to establish a connection with the trailing line of the other aircraft when said aircraft are maneuvered to cause the respective trailing lines to intersect at a point remote from both aircraft and in a position wholly free from any possible interference with the maneuvering or controlling of the aircraft whereby to permit the line from either such aircraft to be drawn into the other of such aircraft.

4. A construction as defined in claim 3, wherein one of the lines is provided with a drogue and the other of said lines is provided with a weight.

5. A construction as defined in claim 3, wherein the means for connecting the lines is in the form of a grapnel.

6. A construction as defined in claim 3, including a quick-releasing device provided for one of said lines and means for operating the quick-releasing device.

7. A construction as defined in claim 3, including a quick-releasing device for one of the lines, said quick-releasing device comprising a longitudinally apertured fitting constructed to permit the line to pass therethrough lengthwise, radially operating resiliently urged retaining means in said fitting, and means for automatically controlling the quick-releasing device.

8. A construction as defined in claim 3, wherein one of the lines from the aircraft is a looped line and wherein a pulley is provided in the aircraft to which the looped line is to be drawn for permitting the looped line to serve as an endless conveyor between the respective aircraft.

9. A means for establishing refueling connection between aircraft in flight, consisting of a fitting in the aircraft to be refueled, a communication between the fitting and the receiving tanks in the aircraft to be refueled, a fuel pipe extending from the aircraft from which the fuel is to be taken, a line connected to the free end of the fuel pipe, said line being passed to the aircraft to be refueled and through the fitting in such aircraft, a pulley over which the line is trained beyond the fitting, and means on the free end of the line to constitute a drag, whereby on releasing the drag-carried end of the line from the aircraft to be refueled, the drag on the line will serve to draw the fuel pipe toward the aircraft to be refueled and into fuel delivery position in the fitting in such aircraft.

10. A method of establishing physical connection between two separate dirigible aircraft having interconnecting elements and while both are in flight, one such element being compelled to follow the aircraft to which it is connected substantially in the line of flight of that aircraft, the other of such elements being compelled to depend from the aircraft to which it is connected at a substantial angle to the line of flight of that aircraft, directing the flight of at least one such aircraft to cause the element carried thereby to cross contact the element carried by the other such aircraft to cause the elements to interengage to establish physical connection between the aircraft at a point remote from both aircraft.

11. A method of establishing physical connection between two dirigible aircraft both in flight by means of lines extending from such aircraft, which consists first in flying said aircraft each with a line extending respectively rearwardly of and downwardly from the aircraft, and second in directing said aircraft so that the course of one line intersects the course of the other to cause the lines to become interengaged.

12. A method of establishing physical connection between two dirigible aircraft both in flight by means of lines extending from such aircraft, which consists first in flying said aircraft each with a line extending respectively rearwardly of and downwardly from the aircraft, and second in directing said aircraft so that the course of one line intersects the course of the other to cause the lines to become interengaged, and drawing in one of said lines to one of said aircraft to thereby cause the other of said lines to be brought in to the one aircraft.

13. A method for use in establishing physical connection between two dirigible aircraft in flight, which consists in first attaching a first line extending from one such aircraft to a part of a second line extending from the other such aircraft, second releasing from such other said aircraft a device to exercise a drag on the other part of said second line whereby said drag causes the first part of said second line and with it said first line to be heaved into said second aircraft subject to a tension limited by the movement of said drag.

RICHARD LLEWELLYN
ROGER ATCHERLEY.